FREQUENCY DIVIDER SYNTHESIZER

Original Filed Dec. 31, 1958 3 Sheets-Sheet 1

INVENTOR
ROBERT R. STONE, JR.

BY Richard A. Reed

ATTORNEY

FREQUENCY DIVIDER SYNTHESIZER

Original Filed Dec. 31, 1958

3 Sheets-Sheet 2

INVENTOR
ROBERT R. STONE, JR.

BY *[signature]*
ATTORNEY

FREQUENCY DIVIDER SYNTHESIZER

Original Filed Dec. 31, 1958

3 Sheets-Sheet 3

INVENTOR
ROBERT R. STONE, JR

BY [signature]
ATTORNEY 3,277,361
FREQUENCY DIVIDER SYNTHESIZER

Robert R. Stone, Jr., Rosecroft Park, Md., assignor to the United States of America as represented by the Secretary of the Navy Original application Dec. 31, 1958, Ser. No. 784,404, now Patent No. 3,119,078, dated Jan. 21, 1964. Divided and this application Sept. 29, 1960, Ser. No. 59,455
1 Claim. (Cl. 321—60)

The invention described herein may be manufactured and used by or for the Government of the United States of America for governmental purposes without the payment of any royalties thereon or therefor.

This invention relates in general to a signal generator and in particular to a frequency synthesizer for generating any desired signal within an extremely wide range of frequencies.

This is a division of my copending application Serial No. 784,404, filed Dec. 31, 1958, now Patent No. 3,119,078, which is entitled Coordinate System Frequency Synthesizer.

In another copending application Serial No. 784,405, now Patent No. 3,125,729, filed Dec. 31, 1958 by Robert R. Stone, Jr. and Harris F. Hastings, Sr., there is disclosed a frequency synthesizer wherein a standard signal source is connected to a group of signal generators to derive signals that control a plurality of interchangeable digit control sections. Each control section includes a selector, requiring a tuned circuit, connected to a first and second mixer and tuned filter. In forming a desired signal, each selector and tuned filter must be positioned to select one of a block of frequencies or to pass a desired frequency. Thus, several tuned circuits must be adjusted for each change in frequency of the output signal, which in certain applications may be a disadvantage.

It is an object of the present invention to provide a frequency divider for use in various electronic equipment such as a frequency synthesizer capable of producing small, accurate increments in the frequency of the output signal.

Figure 1:
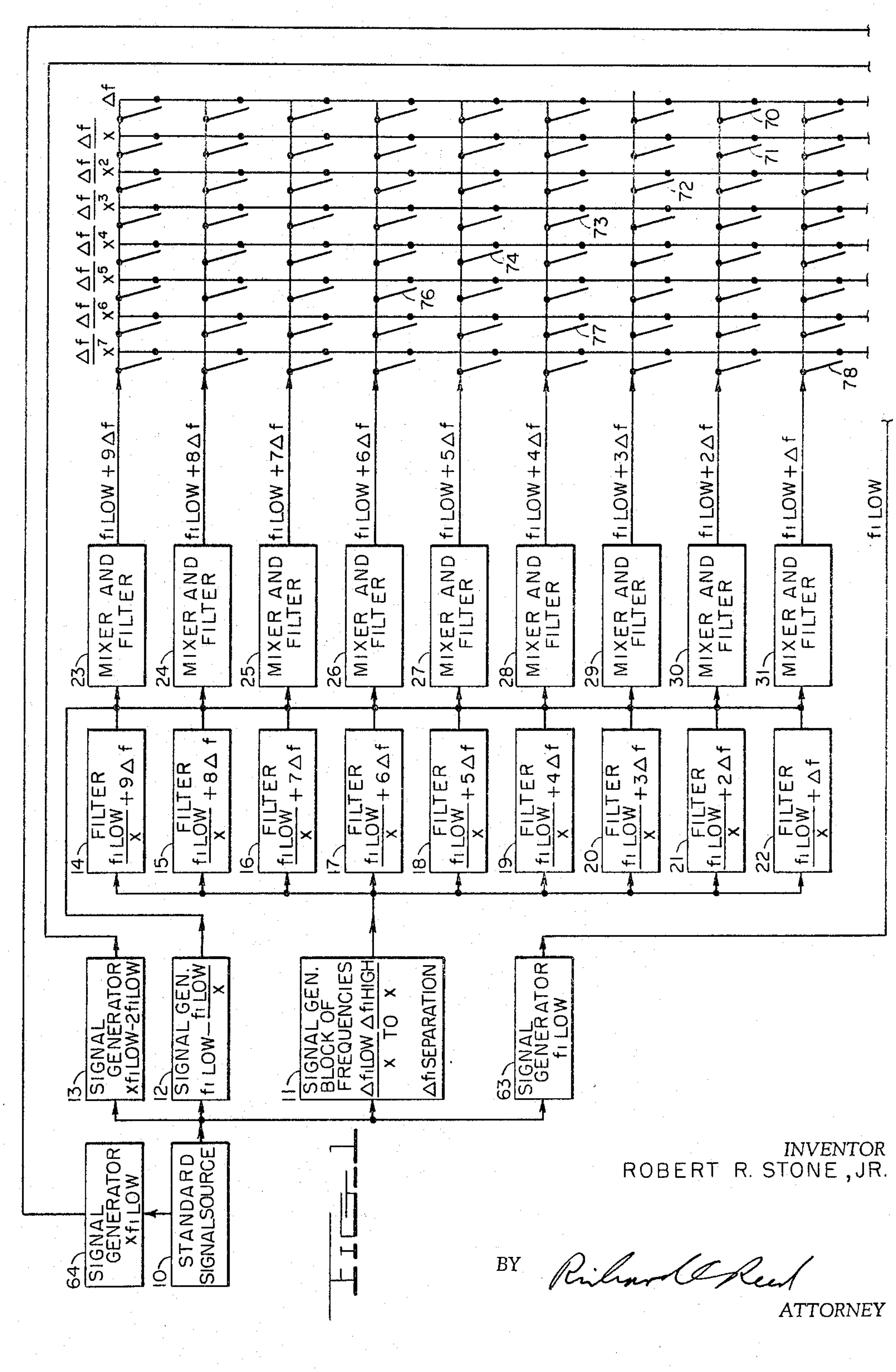
Figure 2:
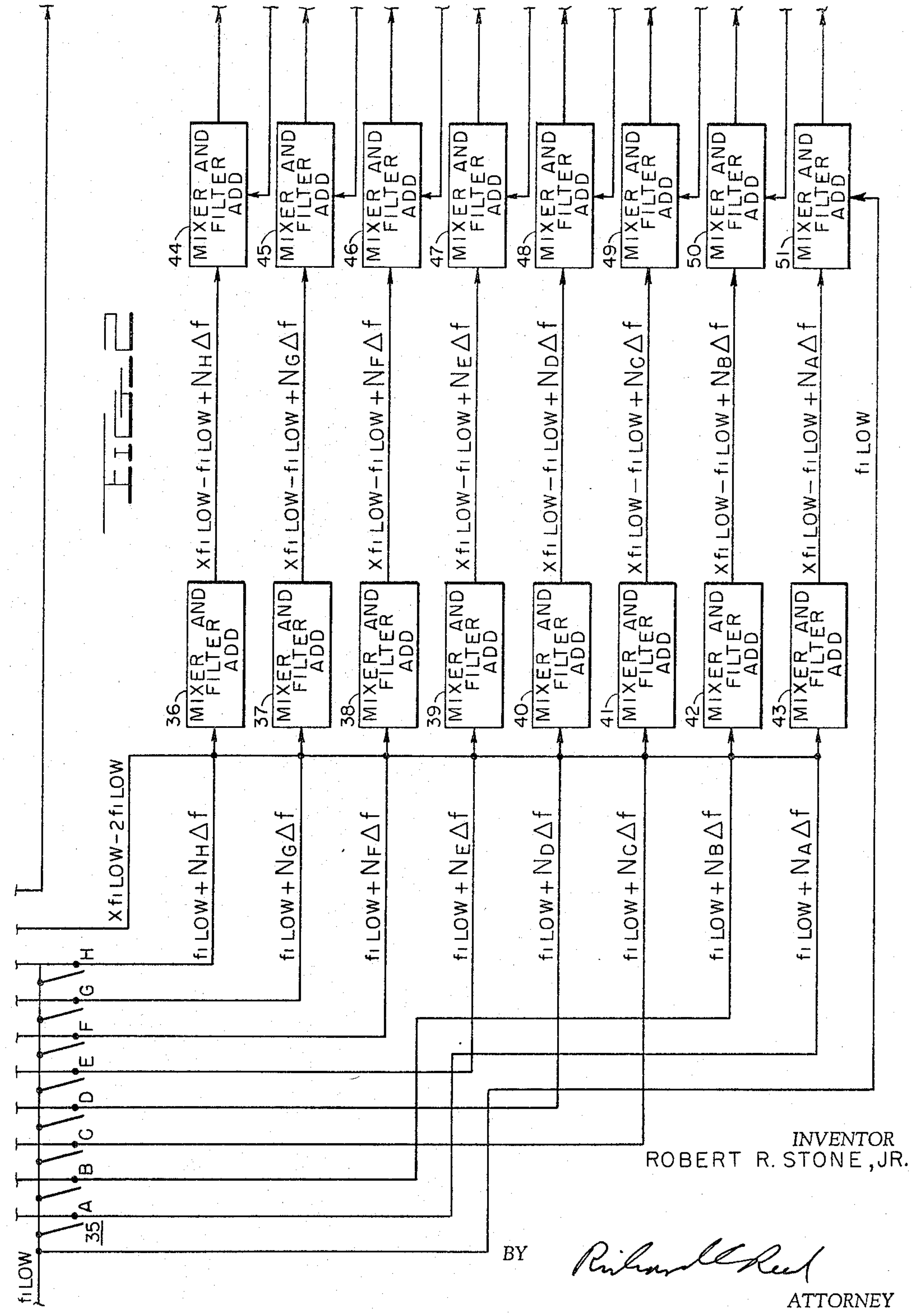
Figures 3, 4:
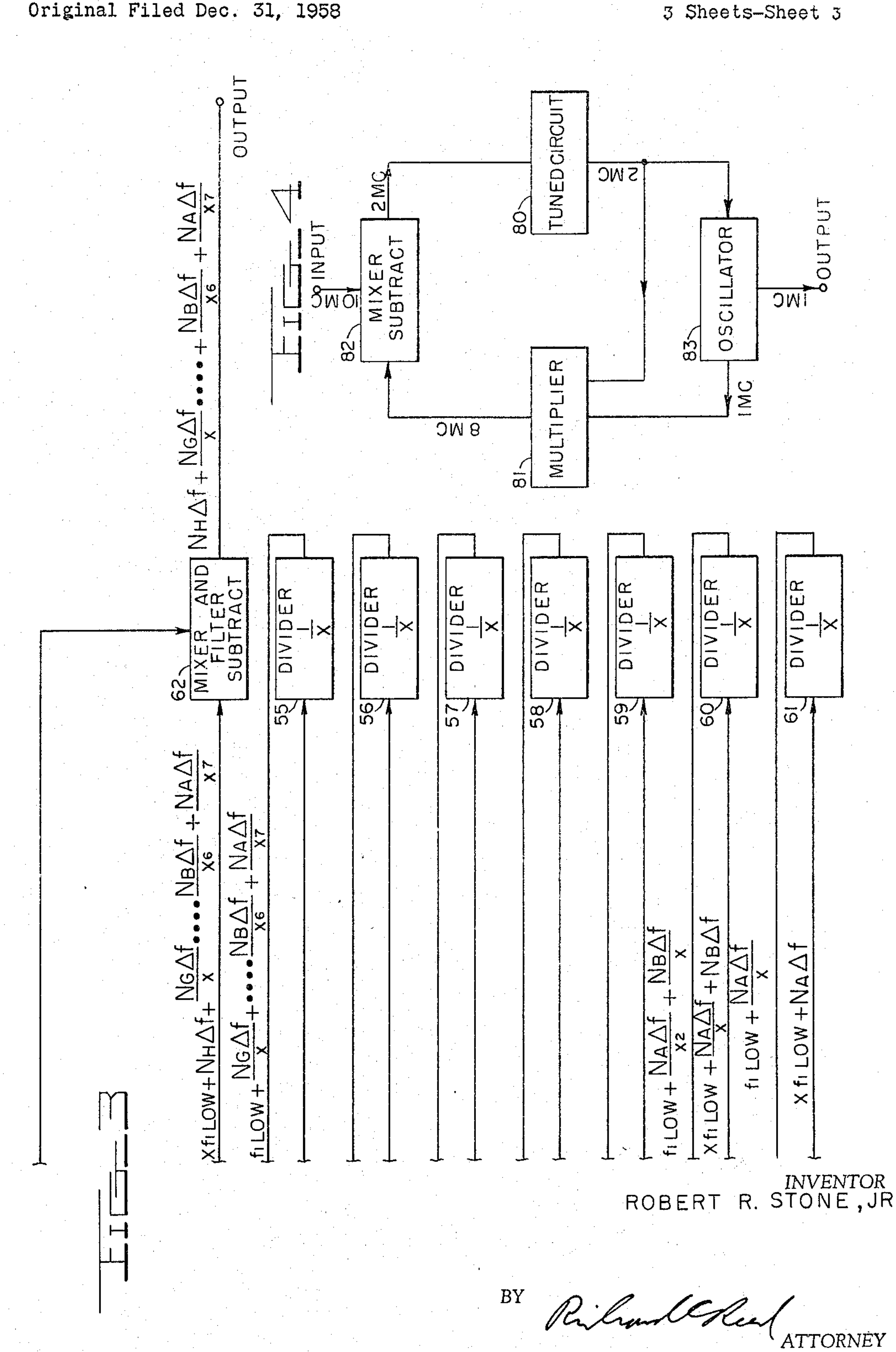

Other objects and features of the invention will become apparent to those skilled in the art as the disclosure is made in the following detailed description of a preferred embodiment of the invention illustrated in the accompanying sheets of drawings in which:

FIGS. 1 to 3 disclose a preferred embodiment of the present invention.

FIG. 4 shows in detail the divider disclosed as hollow blocks in FIGS. 1 to 3.

In accordance with the teachings of the present invention, selected components, including a novel frequency divider, are arranged in a coordinate system to provide a frequency synthesizer. More specifically in the frequency synthesizer which embodies the frequency divider of this invention, a plurality of first signal generators each provide a fixed signal representative of a predetermined digit to be used in a numeral representing a frequency to be synthesized. The number of places in the numeral is determined in part by the number of first signal generators employed. The arrangement for combining the output of the first signal generators and translating each output to the proper place to form a desired signal employs a plurality of second signal generators, each including fixed mixing and filtering means. The second signal generators are connected in cascade in such a manner that the divider in each proceeding generator is connected to the mixing and filtering means in the succeeding one. In operation, a signal within a desired range of frequencies in synthesized by selectively connecting the output of each first signal generator to a respective one of the second signal generators.

Referring to FIGS. 1 to 3, the output of standard signal source 10 drives signal generators 11 to 13 to provide signals that are used to synthesize a desired frequency. The output of signal generator 11 is applied in parallel to filters 14 to 22, and the output of each filter is connected to a respective one of mixer and filters 23 to 31. The signal derived from signal generator 12 is applied in parallel to mixer and filters 23 to 31, each of which in turn is connected to a respective one of the horizontal bars in the cross-bar switch 35. The vertical bars A to H of the cross-bar switch are each connected to a respective one of mixer and filters 36 to 43, so that closing any one of the switches on cross-bar switch 35 will connect one of the mixer and filters 23 to 31 to a respective one of the mixer and filters 36 to 43. It is understood that other devices, such as a patch panel or rotary selector switches connected in tandem, could be used instead of cross-bar switch 35. Mixer and filters 37 and 43 are each connected in cascade with a respective one of the mixer and filters 45 to 51 and a respective one of dividers 55 to 61, while mixer and filters 36, 44 and 62 are connected in cascade. Dividers 55 to 61 assist the filters in cleaning up the signal by removing the desired frequency from the vicinity of unwanted sidebands. Signal generator 63 is driven by standard signal source 10 to provide an output signal that is applied in parallel to a horizontal bar of cross-bar switch 35 and mixer and filter 51, and signal generator 64 is driven by standard signal source 10 to obtain an output signal that is fed to mixer and filter 62. Finally, the output terminal of the frequency synthesizer is connected to mixer and filter 62.

In the operation of the arrangement shown in FIGS. 1 to 3, the output of standard signal source 10 drives signal generators 11 to 13 to obtain signals from the signal generators equal to $$\frac{\Delta f_{1\,\mathrm{low}}}{X} \text{ to } \frac{\Delta f_{1\,\mathrm{high}}}{X}$$

with $\Delta f$ separation, $$f_{1\,\mathrm{low}}-\frac{f_{1\,\mathrm{low}}}{X}$$

and $X f_{1\,\mathrm{low}}-2 f_{1\,\mathrm{low}}$, respectively, where X may be any selected number. The output of signal generator 11 is connected in parallel with filters 14 to 22, each of which have an output signal separated by $\Delta f$ so that the output signal of filter 14 is equal to $$\frac{f_{1\,\mathrm{low}}}{X}+9\Delta f$$

and that of filter 22 is equal to $f_{1\,\mathrm{low}}+\Delta f$. The output signal of signal generator 12 is applied in parallel to mixer and filters 23 to 31 where it is heterodyned with the output of a respective one of filters 14 to 22 to provide signals that vary from $f_{1\,\mathrm{low}}+\Delta f$ for mixer and filter 31 to $f_{1\,\mathrm{low}}+9\Delta f$ for mixer and filter 23. These signals in addition to the output of signal generator 63, which is equal to $f_{1\,\mathrm{low}}$, are applied to the horizontal bars of cross-bar switch 35, so that the value of the signal derived from each vertical bar A to H may be varied from $f_{1\,\mathrm{low}}$ to $f_{1\,\mathrm{low}}+9\Delta f$ and this value is determined by the switch, connected to the vertical bar, that is selected and closed. Thus, the signals derived from the vertical bars vary, as shown in FIG. 2, from $f_{1\,\mathrm{low}}+N_A\Delta f$ to $f_{1\,\mathrm{low}}+N_H\Delta f$, where N may be any number, in this case, from 1 to 9 and subscripts A to H represent the vertical bar from which the signal is obtained. Each signal obtained from the vertical bars is applied to a respective one of the mixer and filters 36 to 43, where it is heterodyned with the signal provided by signal generator 12 to derive signals that may vary from $Xf_{1\,\mathrm{low}}-f_{1\,\mathrm{low}}+N_A\Delta f$ to $$Xf_{1\,\mathrm{low}}-f_{1\,\mathrm{low}}+N_H\Delta f$$

The signals thus obtained are each applied to a selected one of the mixer and filters 44 to 51. The output of mixer and filter 43, $Xf_{1\,low} - f_{1\,low} + N_A\Delta f$, is applied to mixer and filter 51, where it is added to $f_{1\,low}$. The output of mixer and filter 51 is applied to divider 61 and divided by X therein to obtain.

$$f_{1\,low} - \frac{N_A\Delta f}{X}$$

This latter signal is fed to mixer and filter 50, where it is added to $Xf_{1\,low} - f_{1\,low} + N_B\Delta f$ to provide $$Xf_{1\,low} + N_A\Delta f + N_B\Delta f$$

as an output signal that is divided by X in divider 60 to obtain $$f_{1\,low} + \frac{N_A\Delta f}{X^2} + \frac{N_B\Delta f}{X}$$

which is applied to mixer and filter 49. The steps indicated above are continued in each succeeding bank of mixer and filters and dividers until a signal equal to $$f_{1\,low} - \frac{N_G\Delta f}{X} \cdots - \frac{N_B\Delta f}{X^6} - \frac{N_A\Delta f}{X^7}$$

is obtained from divider 55. This last signal is applied to mixer and filter 44 and added therein to $$X_1 f_{1\,low} - f_{1\,low} - N_H\Delta f$$

to derive $$Xf_{1\,low} - N_H\Delta f - \frac{N_G\Delta f}{X} \cdots - \frac{N_B\Delta f}{X^6} - \frac{N_A\Delta f}{X^7}$$

which is applied to mixer filter 62, where $Xf_{1\,low}$ is subtracted to obtain $$N_H\Delta f - \frac{N_G\Delta f}{X} \cdots - \frac{N_B\Delta f}{X^6} - \frac{N_A\Delta f}{X^7}$$

as the output of the embodiment disclosed in FIGS. 1 to 3.

In a typical example of the operation of the embodiment of the invention shown in FIGS. 1 to 3:

Let: $X$=base 10

$$f_{1\,low} = 1 \text{ mc.}, f_{1\,high} = 1.09 \text{ mc. and } f = 10 \text{ kc.}$$

Then:

$$Xf_{1\,low} - 2f_{1\,low} - 8 \text{ mc.}$$

The output of filters 14 to 22 is equal to:

$$\frac{f_{1\,low}}{X} + f \text{ to } \frac{f_{1\,low}}{X} - 9\Delta f = 110 \text{ kc. to } 190 \text{ kc.}$$

Finally, the output of mixer and filters 23 to 31 is equal to:

$$f_{1\,low} - f \text{ to } f_{1\,low} - 9\Delta f - 1.01 \text{ mc. to } 1.09 \text{ mc.}$$

The switches on cross-bar switch 35 determine digits in a number having the following places:

$$f, \frac{\Delta f}{X} \cdots \frac{\Delta f}{X^6}, \frac{\Delta f}{X^7} = \text{ten thousands, thousands} \cdots \text{hundredths, and thousandths}$$

If a signal having a frequency of 22,345.641 cycles/second is to be formed, switches 70 to 78 of cross-bar switch 35 are closed applying signals equal to 1.02, 1.02, 1.03, 1.04, 1.05, 1.06, 1.04, and 1.01 mc. to mixers 36 to 43, respectively. In mixer and filter 43, the 1.01 mc. signal is added to 8.0 mc. to provide a signal equal to 9.01 mc., which is added to 1.0 mc. in mixer and filter 51. The sum, 10.01 mc., is divided by 10 in divider 61 to obtain 1.001 mc. which is fed to mixer and filter 50, where it is added to 9.04 mc. to give 10.041 mc. The last signal is then divided by 10 to provide 1.0041 as the output of divider 60. The same process is followed in each succeeding bank of mixer and filters and dividers, so that the output signal of dividers 59 to 55 are 1.00641, 1.005641, 1.0045641, 1.00345641, and 1.002345641, respectively. The output of divider 55, equal to 1.002345641, is applied to mixer and filter 44 and is added to 9.02 mc. giving 10.022345641. The latter signal is applied to mixer and filter 62, where 10 mc. is subtracted to provide the desired output signal, 22,345.641 cycles/second.

Referring to FIG. 4, a divider is disclosed wherein tuned circuit 80 and multiplier 81 are connected in cascade between the output and an input of mixer 82. One output of oscillator 83, which may be of the free running type that is locked on a desired frequency, is connected between tuned circuit 80 and multiplier 81; and input and output terminals are connected to another input of mixer 82 and to another output of oscillator 83, respectively. In the particular example illustrated in this figure, the signals applied to mixer 82 are subtracted and the output signals of mixer 82, tuned circuit 80, multiplier 81 and oscillator 83 are 2, 2, 8, and 1 mc., respectively. The divider will divide an input signal of 10 mc. by 10 to provide an output signal of 1 mc. having the same accuracy as the input signal. It is understood that the components in FIG. 4 could be selected to provide an output signal having any selected frequency, and that other divisors than 10 could be used, if desired.

In the operation of the divider shown in FIG. 4, assume that momentarily no signal is applied to the input of mixer 82. (This would occur during the switching operation of the arrangement shown in FIGS. 1 to 3, i.e., when the output signal is changed from one frequency to another.) Since oscillator 83 is free running, it will continue to apply a signal of approximately 1 mc. to multiplier 81, which in turn will continue to apply an 8 mc. signal to mixer 82, so that when a 10 mc. signal is applied to the input terminal of the divider, an output signal of 2 mc. will be derived from mixer 82 and applied to tuned circuit 80. Oscillator 83 will then lock on the output of tuned circuit 80 to provide a signal of 1 mc. at the output terminal of the divider with the same accuracy as the 10 mc. input.

It should be understood, of course, that the foregoing disclosure relates to only a preferred embodiment of the invention and that numerous modifications or alterations may be made therein without departing from the spirit and scope of the invention as set forth in the appended claim.

What is claimed is:

In a divider; a mixer having first and second inputs and an output, tuned circuit means connected to said output of said mixer, a free running oscillator for providing an output signal adapted to be locked on a signal having a desired frequency, means connecting a first output of said tuned circuit means to said oscillator, multiplier means adapted to provide an output signal which is a selected multiple of an input signal, means for applying the output of said oscillator to said multiplier means for connecting a second output of said tuned circuit means to said multiplier means connecting the output signal of said multiplier to said first input of said mixer, and means for applying an input signal to be divided to said second input of said mixer, said tuned circuit means being tuned to the difference frequency in the output of said mixer.

References Cited by the Examiner

UNITED STATES PATENTS

| | | | |
|---|---|---|---|
| 2,159,596 | 5/1939 | Miller | 328—25 |
| 2,562,952 | 8/1951 | Russell | 331—41 |
| 2,926,244 | 2/1960 | Stryker | 328—25 |
| 3,007,117 | 10/1961 | Cutler | 331—51 |

JOHN F. COUCH, *Primary Examiner.*

FREDERICK M. STRADER, *Examiner.*

T. D. JENNINGS, K. CLAFFY, G. GOLDBERG, *Assistant Examiners.*